United States Patent
Kato et al.

(10) Patent No.: US 6,524,748 B1
(45) Date of Patent: Feb. 25, 2003

(54) CARBONACEOUS NEGATIVE ELECTRODE MATERIAL FOR NONAQUEOUS SECONDARY BATTERY, PROCESS FOR PRODUCING THE SAME, AND NONAQUEOUS SECONDARY BATTERY

(75) Inventors: Akio Kato, Kagawa (JP); Noritoshi Takao, Kagawa (JP); Tomiyuki Kamada, Kagawa (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 09/556,190

(22) Filed: Apr. 21, 2000

Related U.S. Application Data

(63) Continuation-in-part of application No. 09/128,842, filed on Aug. 4, 1998, now Pat. No. 6,150,055.

(30) Foreign Application Priority Data

Aug. 5, 1997  (JP) ............................................... 9-210497

(51) Int. Cl.⁷ ................................................. H01M 4/60
(52) U.S. Cl. .................................. 429/231.8; 429/231.95
(58) Field of Search ........................... 429/231.8, 231.7, 429/231.4; 423/445 R, 448

(56) References Cited

U.S. PATENT DOCUMENTS 5,153,082 A * 10/1992 Ogino et al.
5,451,477 A *  9/1995 Omaru et al.
6,150,055 A * 11/2000 Kato et al.

FOREIGN PATENT DOCUMENTS

EP          896377 A1 *  2/1999
JP     2000-021411 A  *  1/2000

* cited by examiner

*Primary Examiner*—Patrick Ryan
*Assistant Examiner*—Susy Tsang-Foster
(74) *Attorney, Agent, or Firm*—Oblon, Spivak, McClelland, Maier & Neustadt, P.C.

(57) ABSTRACT

A carbonaceous negative electrode material for nonaqueous secondary batteries having (i) not less than $2 \times 10^{-4}$ cc/g of pores having a diameter of smaller than 8 Å and (ii) not more than $15 \times 10^{-4}$ cc/g of pores having a diameter of 8 to 18 Å. The material exhibits a high capacity and a high efficiency.

7 Claims, 1 Drawing Sheet

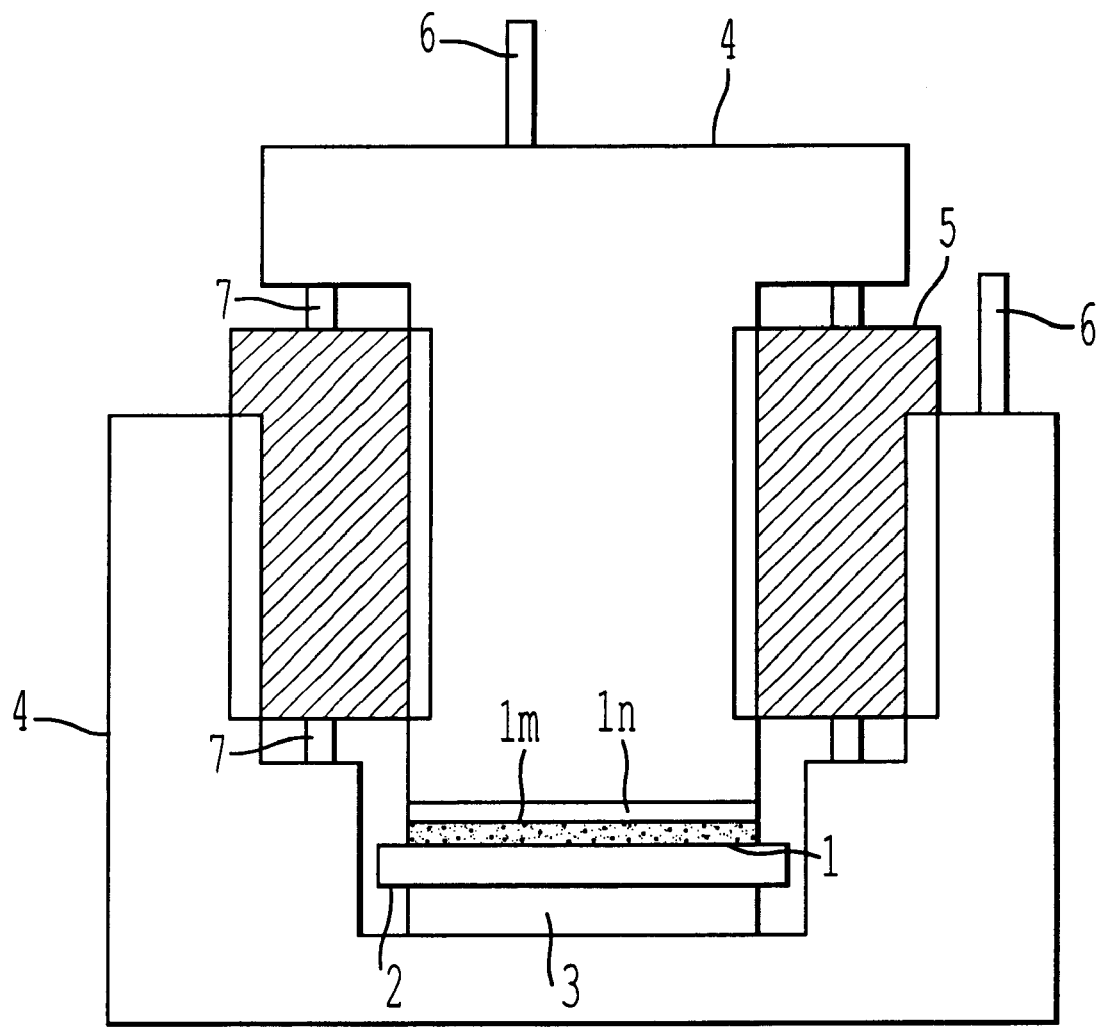

ial for nonaqueous secondary batteries, a process for producing the negative electrode material, and a nonaqueous secondary battery containing the negative electrode material. More particularly, it relates to a carbonaceous material having a specific micropore size distribution and amount which is particularly suited as a negative electrode material of nonaqueous secondary batteries, a process for producing the same, and a nonaqueous secondary battery typified by a lithium ionsecondary battery, which is suitable for use in compact and light electronic equipment, for use in an electric car power load leveling, both of which require high capacity and high energy density.

2. Description of the Related Art

The demand for rechargeable secondary batteries has been increasing in pursuit of reduction of size and weight and improvement of function of electronic equipment and high attention paid to the electric car caused by an environmental pollution. Clean nonaqueous batteries, such as nickel-hydrogen or lithium batteries, have been attracting attention as batteries meeting the demand, taking the place of lead or nickel-cadmium batteries from the viewpoint of power saving and environmental conservation. In particular, lithium ion secondary batteries have been gaining weight from their lightness and high voltage and been put to practical use. Lithium ion secondary batteries developed in the early years used metallic lithium in the negative electrode, which turned out disadvantageous in that a dendrite grows from metallic lithium to cause an internal short-circuit. Then materials capable of intercalating and deintercalating lithium ion have been developed in place of metallic lithium. Along this line, carbonaceous materials, such as coke, and graphite materials, such as natural graphite, have been used mainly (see JP-A-2-90863, JP-A-1-221859, and JP-A-63-121257, the term "JP-A" as used herein means an "unexamined published Japanese patent application").

Of the carbonaceous materials and the graphite materials, the carboneous materials prepared by calcining at relatively low temperatures, for example 1500° C. or lower, can be seen as promising. as high-capacity and low-cost negative electrode materials. On the other hand, although carbonaceous materials are relatively inexpensive and safe and have a high charge capacity in the initial stage of use, their charge and discharge capacity in the later stage is about $2/3$ of the theoretical capacity density of carbon-graphite materials (372 mAh/g). Batteries containing the conventional carbonaceous materials are not satisfactory in charge and discharge capacity and efficiency, leaving room for improvement.

The inventors of the present invention previously found that the high initial charge capacity of a carbonaceous material owes to its volatile matter, that the volatile matter which is released on heating is partly carbonized to interfere with the manifestation of the capacity of the carbonaceous material, and that the volatile matter can be removed efficiently by pulverizing the carbonaceous material followed by heating at a high temperature (calcination) thereby to suppress remaining of the carbonized volatile matter. These findings were filed for a patent (JP-A-8-287911).

SUMMARY OF THE INVENTION

As a result of further study, the inventors have reached the findings that the remained volatile matter, especially free organic high-molecular substances, which has been a main cause of the above-mentioned problem can be removed efficiently by subjecting fine carbonaceous powder to specific heat treatment to obtain a carbonaceous material having a controlled micropore size distribution and thereby exhibiting improved charge and discharge capacity and efficiency when used as a negative electrode material in a nonaqueous secondary battery.

Completed based on the above findings, the present invention provides a carbonaceous negative electrode material for nonaqueous secondary batteries having (i) not less than $2 \times 10^{-4}$ cc/g of pores having a diameter of smaller than 8 Å, (ii) not more than $15 \times 10^{-4}$ cc/g of pores having a diameter of 8 to 18 Å and (iii) not more than $1 \times 10^{-4}$ cc/g of pores having a diameter not larger than 20 Å.

The present invention further provides a nonaqueous secondary battery containing the carbonaceous material as a negative electrode material.

The present invention furthermore provides a process for producing a carbonaceous negative electrode material for nonaqueous secondary batteries comprising heating a particulate carbonaceous material having an average particle size of not greater than 100 μm at a temperature of 250 to 650° C. in an inert gas atmosphere and then heating (calcining) the particles at a temperature of 700 to 1500° C. in an inert gas atmosphere (hereinafter referred to as a first process), or heating a particulate carbonaceous material having an average particle size of not greater than 100 μm at a temperature of 50 to 400° C. in an oxidative atmosphere and then heating (calcining) the particles at a temperature of 700 to 1500° C. in an inert gas atmosphere (hereinafter referred to as a second process).

In the second process, the heating at 50 to 400° C. in an oxidizing gas atmosphere can be preceded and/or followed by a heat treatment at a temperature of 250 to 650° C. in an inert gas atmosphere (hereinafter referred to as a third process).

According to the present invention, a negative electrode material for nonaqueous secondary batteries having a high capacity and a high efficiency can be obtained with ease from inexpensive carbonaceous raw materials.

BRIEF DESCRIPTION OF THE DRAWING

FIG. 1 is a cross section of a button type nonaqueous secondary battery.

DESCRIPTION OF THE PREFERRED EMBODIMENT

The carbonaceous material which can be used as a raw material in the present invention includes coke obtained by coking heavy petroleum fractions, such as FCC (fluidized bed catalytic cracking) residual oil, EHE oil (by-produced oil in ethylene production), atmospheric residual oil, and low pressure residual oil; heavy coal fractions, such as coal tar and coal tar pitch; or tarry substances obtained by heating polycyclic aromatic compounds, such as naphthalene and anthracene, in a delayed coker, an autoclave, etc. at about 400 to 500° C.

Carbonaceous materials obtained by carbonizing phenolic resins, furan resins, wood, bamboo, coal, etc. at a realatively low temperature, e.g., 700° C. or lower are also useful.

It is preferred for these carbonaceous raw materials to have a volatile content of not greater than 30% by weight, particularly not greater than 15% by weight, especially not greater than 10% by weight. The effects of the present invention can be obtained even in using a raw material having a volatile content exceeding 30%. In this case, however, a long time would be required for a first stage heat treatment, the finely particulate carbonaceous material may tend to be fused on heating to make release of the volatile matter hardly, or dust explosion of the particulate carbonaceous material may tend to occur during pulverization.

The carbonaceous negative electrode material of the present invention can be obtained by pulverizing the raw carbonaceous material and subjecting the resulting particulate carbonaceous material to at least two-divided heat treatments. Pulverization prior to heat treatment is of importance. Pulverization is carried out to reduce the average particle size to 100 $\mu$m or smaller, preferably 50 $\mu$m or smaller. The practical lower limit of the pulverized particle size is 1 $\mu$m. The manner of pulverization and operations for particle size regulation, such as classification, are not particularly limited. For example, commonly employed pulverizers, such as an impact pulverizer and an attrition mill, and various air classifiers, such as a sieve, can be used. For securing efficiency of volatile matter removal, it is preferred that the resulting particles do not practically contain particles of 500 $\mu$m or greater, particularly 200 $\mu$m or greater. In the case that maximum diameter of the particles excesses 500 $\mu$m, removal efficiency of volatile matter is easy to be lowered and it is difficult to obtain an electrode having a uniform thickness. Further it is more difficult to make the thickness of the electrode thinner so that the surface area of the electrode is enlarged.

In the first process of the invention, the pulverized carbonaceous material is subjected to a first stage heat treatment at 250 to 650° C. in an inert gas atmosphere and then to a second stage heat treatment at 700 to 1500° C. in an inert gas atmosphere (two-stage heat treatment). While not limiting, the first stage heat treatment is usually performed in a rotary kiln, an electric furnace, etc. A preferred heating temperature of the first stage heat treatment is 300 to 550° C., particularly 400 to 550° C. The heating time varies depending on the particle size or the state of the particles to be heated. The heating is continued until the volatile matter is substantially eliminated at a heating temperature selected from the range 250 to 650° C., usually until the volatile content is reduced to 3% by weight or lower, preferably 1% by weight or lower, which usually takes 5 hours at the longest.

In order to facilitate release of the volatile matter by heating, it is preferable to put the particles in a layer as thin as about 50 mm or less, to agitate the particles so that the particle surface may always be in contact with air, or to fluidize the particles by gas. It is also preferred to add an auxiliary means for removing the released volatile matter by conducting the heat treatment under low pressure or to sweep the released volatile matter with a large quantity of gas.

By this first stage heat treatment the most of the volatile content in the particles, especially the most of the volatile matter derived from free organic compounds can be released.

The particles are then subjected to a second stage heat treatment at 700 to 1500° C. in an inert gas atmosphere. The heating means is not particularly limited and includes a rotary kiln and an electric furnace similarly to the first stage heat treatment. The second stage heat treatment may be carried out in a system separate from the first stage heat treatment or a system continuous from the first stage heat treatment. In the latter case, it is desirable to take care to prevent the vapor released in the first stage treatment from entering the second heating zone and from being re-carbonized and re-deposited.

The second stage heat treatment should be conducted in a substantially inert atmosphere. A preferred heating temperature is 800 to 1200° C. While dependent on the desired battery performance, a still preferred heating temperature is 1000 to 1200° C. The heating is continued until the carbonization reaction completes substantially at a temperature selected, usually for a period of 15 minutes to 2 hours.

In order to release any volatile matter remaining after the first stage heat treatment early and rapidly, it is preferable to put the particles in a layer as thin as about 50 mm or less, to agitate the particles so that the particle surface may always be in contact with air, or to fluidize the particles by gas. For the same purpose, it is also preferred to conduct the heat treatment under low pressure or to sweep the remained volatile matter with a large quantity of gas.

In the second process of the present invention, the pulverized carbonaceous material is first subjected to a heat treatment at 50 to 400° C. in an oxidizing gas atmosphere (hereinafter sometimes referred to as a first stage heat treatment (an oxidizing gas treatment)), which is usually carried out, while not limiting, in a rotary kiln, an electric furnace or a drying apparatus.

The heating temperature and time vary depending on the particle size or the state of the particles and the kind of the oxidizing gas used. In using air, for example, the treatment is usually performed at a temperature of 250 to 400° C. for 30 minutes to 10 hours. In using $NO_x$, $SO_x$, halogen gas, etc. in combination with air, the treatment is usually conducted at a temperature of 50 to 200° C. for about 5 minutes to 3 hours. The heating conditions are of necessity not limited to these ranges and can be selected appropriately according to the desired degree of treatment.

Similarly to the first process, the first stage heat treatment is preferably carried out with the particles made into a layer as thin as about 50 mm or less or while agitating the particles to always maintain the particles in contact with air or fluidizing the particles by gas thereby to facilitate uniform progress of the oxidation reaction and release of the volatile matter.

The first stage heat treatment of the second process is the same as the first stage heat treatment of the first process in that the volatile matter is released by heating. In addition thereto, the volatile matter simultaneously undergoes oxidation to have a structure easier to release by heating (to have such a chemical bond as an —O— bond). As a result, the volatile matter is released more easily, and the residual volatile matter that cannot be released by the first stage heat treatment will be released long before the start of carbonization induced by the subsequent second stage heat treatment in an inert gas atmosphere.

Compared with the first process, the second process achieves an increased volume of micropores in which lithium ion is intercalated probably because the chemical bond is also formed among the carbonaceous microcrystallites by the oxidation reaction and remains until the start of the carbonization reaction in the subsequent second stage heat treatment in an inert atmosphere.

After completion of the first stage heat treatment, the particles are subjected to a second stage heating treatment at 700 to 1500° C. in an inert gas atmosphere in the same manner as for the second stage heat treatment of the first process.

In the third process of the invention, the first stage heat treatment in an oxidizing gas atmosphere of the second process is combined with the two-stage heat treatment of the first process in an inert atmosphere to further ensure the release of the volatile matter. The third process is particularly effective where the temperature of the heat treatment in the oxidizing gas atmosphere is low or where the raw carbonaceous material used has a high volatile content. In this process, the heat treatment in an oxidizing atmosphere can be carried out before and/or after, preferably before, the heat treatment at 250 to 650° C. in an inert gas atmosphere. Finally, the treated particles are subjected to the heat treatment at 700 to 1500° C. in an inert gas atmosphere.

The particulate carbonaceous material thus produced has micropores having a diameter smaller than 8 Å which are suited to intercalate lithium ion in a total volume of not less than $2 \times 10^{-4}$ cc/g and greater pores having a diameter of 8 to 18 Å which incur deactivation of the micropores (smaller than 8 Å) in a total volume of not more than $15 \times 10^{-4}$ cc/g. The particulate carbonaceous material preferably has a volatile content of not more than 1% by weight from the standpoint of charge and discharge capacity.

The size of the carbonaceous crystallites which is the greatest factor decisive for the total volume of micropores of smaller diameter than 8 Å varies depending on the raw carbonaceous material. It usually ranges from 10 to 50 Å in terms of crystal thickness (Lc) and from 3.40 to 3.55 Å in terms of lattice spacing of a 002 lattice (d002) as measured by X-ray diffractometry.

The size and volume of the pores are measured by a BET nitrogen adsorption method by use of, for example, AUTOSORB-1 manufactured by Quantachrom.

The following mechanism seems to control the formation of the novel carbonaceous negative electrode material of the present invention under the selected conditions and the manifestation of the excellent effects of the carbonaceous negative electrode material.

The raw carbonaceous material contains volatile matter, which is composed chiefly of free organic compounds having relatively low molecular weights and low-molecular organic compounds released from the carbonaceous skeleton with the progress of carbonization. These volatile compounds are vaporized and released from the carbonaceous material on heating at high temperatures. On the other hand, the progress of carbonization by heating is accompanied by shrinkage of the skeleton. If the volatile matter is released in this stage of shrinkage, it develops fine cracks in the carbonaceous skeleton to form the route of escape under mutual actions of pressure of gasification and pressure of shrinkage, resulting in formation of pores having relatively small sizes. The greater particle size has the carbonaceous material, the more noticeable becomes this tendency.

Lithium ion intercalation by a carbonaceous negative electrode material in a lithium ion secondary battery consists of intercalation between layers of crystallites constituting the carbonaceous material (a precursor of graphite crystals), i.e., between 002 lattices obtained by X-ray diffractometry and intercalation in micropores of several angstroms among the crystallites. In the latter mode of lithium ion intercalation, if the micropores are connected to greater pores to form open pores, the intercalation activity and efficiency are lost. Therefore, a large volume of micropores does not lead to increases in charge and discharge capacity and efficiency in the presence of a large volume of greater pores.

According to the first process of the present invention, because a raw carbonaceous material is heated in a finely pulverized state, the volatile matter can escape easily so that the most part of the volatile matter is released before the progress of carbonization is accelerated. Formation of relatively large pores due to the release of the vapor is thus suppressed while carbonization proceeds. At the same time, the pores which have been formed by the release of vapor in the initial stage of heat treatment are collapsed to disappear or reduced to smaller pores by the pressure of shrinkage with the progress of carbonization. As a result, it is possible to prevent formation of open pores connected to micropores into which lithium ion is to be intercalated.

As a result of the first stage heat treatment at 250 to 650° C. in an inert gas atmosphere, release of the volatile matter almost completes before the commencement of carbonization, so that the effects of the second stage heat treatment at 700 to 1500° C. in an inert gas atmosphere can be exerted easily.

In the second and third processes of the present invention, the heat treatment at 50 to 400° C. in an oxidizing gas atmosphere causes the carbonaceous material to react with the oxidizing gas to generate a structure easier to release by heating (a chemical bond) in the volatile compounds. As a result, manifestation of the effects of the above-described heat treatment at 250 to 650° C. or 700 to 1500° C. is ensured, and also the total volume of the micropores for lithium ion intercalation increases.

Therefore, it is preferable to combine the heat treatment at 250 to 650° C. in an inert gas atmosphere and the heat treatment at 700 to 1500° C. in an inert gas atmosphere with the heat treatment at 50 to 400° C. in an oxidizing gas atmosphere.

The resulting carbonaceous material can be used as a negative electrode material of nonaqueous secondary batteries, such as lithium ion secondary batteries.

For use as a negative electrode material, the carbonaceous material of the present invention is mixed with a binder, a solvent (supporting medium), graphite which is used corresponding to requirement, etc., and the resulting pastry mixture is applied to metallic foil, such as copper foil, dried, and compressed. Example of useful binders include polyvinylidene fluoride, polytetrafluoroethylene, polyethylene, and synthetic rubber. Suitable solvents include N-methyl-2-pyrrolidone, dimethylformamide, and water. For use as a graphite which is used corresponding to requirement, highly crystallized natural graphite, highly crystallized artificial graphite, re-heated product of the natural or artificial graphite, re-heated product of expansionary, high purified product of these graphites, graphite, the surface of which is partially coated with an amorphous carbon, obtained by mixing the graphite and an organic material for example, a heated pitch obtained by heating heavy coal oil, heavy petroleum oil, or separable (dissolvable) heavy oil, and then firing them and etc. In this invention, a mixing ratio of the graphite in the carbon material is preferably not more than 80 weight %, more preferably not more than 60 weight %.

A positive electrode material and an electrolytic solution (a solution of an electrolyte in a nonaqueous solvent) which can be used in nonaqueous secondary batteries are not particularly limited, and any conventional materials can be used. Examples of suitable positive electrode active materials include $LiCoO_2$, $MnO_2$, $TiS_2$, $FeS_2$, $Nb_3S_4$, $Mn_3S_4$, $CoS_2$, $V_2O_5$, $P_2O_5$, $CrO_3$, $V_3O_8$, $TeO_2$, and $GeO_2$. Examples of suitable electrolytes are $LiClO_4$, $LiBF_4$, and $LiPF_6$. Example of the nonaqueous solvents for dissolving the electrolyte include propylene carbonate, tetrahydrofuran, 1,2-dimethoxyethane, dimethyl sulfoxide, dioxolane, dimethylformamide, dimethylacetamide, and mixtures thereof.

As a separator, porous material is used for preference for decreasing the internal resistance of a battery. Separators made of organic solvent-resistant materials, such as nonwoven fabric of polypropylene, etc. and a glass filter are used.

The negative electrode, positive electrode, and separator are generally put into a battery case made of stainless steel or nickel-plated stainless steel. The battery can have a cylindrical form in which a positive electrode and a negative electrode both having a band form are rolled with a separator therebetween or a button form in which a positive electrode pellet and a negative electrode disc are put in a button-shaped case with a separator therebetween.

The present invention will now be illustrated in greater detail with reference to Examples, but it should be understood that the present invention is not construed as being limited thereto. Unless otherwise noted, all the percents are by weight.

EXAMPLE 1

Green coke having a volatile content of 5.4% which was obtained by coking coal tar was pulverized in a jet mill to obtain fine particles having an average particle size of 12 $\mu$m and a maximum particle size of 40 $\mu$m. The particles were put in a stainless steel-made tray in a layer 10 mm thick. The tray was placed in a box type electric furnace and heated up to 450° C. at a rate of temperature rise of 10° C./min in a nitrogen stream, at which the particles were kept for 1 hour to conduct a first stage heat treatment.

After once cooled, the tray was taken out from the oven and transferred to a graphite-made tray in a 10-mm thick layer. The tray was again placed in the box type electric furnace and heated in a nitrogen stream at a rate of 10° C./min up to a temperature of from 800 to 1200° C. as shown in Table 1 below, at which the particles were maintained for 1 hour to conduct a second stage heat treatment.

The resulting carbonaceous negative electrode material was degassed (dried) in vacuum at 350° C. for 1 hour. The adsorption isotherm and BET plot were obtained by nitrogen adsorption at a liquid nitrogen temperature by use of AUTOSORB-1 manufactured by Quantachrom and analyzed by a Horvath-Kawazoe method to measure the volume of micropores having a pore size up to 18 Å.

In order to measure the charge and discharge capacity of the resulting carbonaceous negative electrode material, a test battery having the structure shown in FIG. 1 was assembled. Negative electrode 1 was made by compressing a mixture of the carbonaceous negative electrode material 1m and 10% of polyvinylidene fluoride onto a stainless steel net 1n having a diameter of 20 mm, and positive electrode 3 was made by pressing metallic Li foil onto a stainless steel net of the same size. A 1 mol/l solution of $LiPF_6$ in propylene carbonate was used as an electrolytic solution (numeral 2 indicates a separator and the electrolytic solution). As for a battery capacity, the negative electrode was made smaller enough than the positive electrode. Numerals 4, 5, 6, and 7 indicate a stainless steel-made battery case, an insulator made of polytetrafluoroethylene, charge and discharge terminals, and a gasket, respectively.

The test battery was charged to 0.01 V (with reference to Li electrode) at a charging current of 0.5 mA/cm$^2$ and, while maintaining the voltage at 0.01 V, charging was continued until the charging current decreased to 0.03 mA/cm$^2$ or lower. Subsequently, the battery was discharged to 1.5 V at a constant current of 0.5 mA/cm$^2$.

The measurements of micropore volume and charge and discharge capacity and efficiency were made on the resulting carbonaceous negative electrode material. The results obtained are shown in Table 1.

TABLE 1

|  | 2nd stage Heating Temp. (° C.) | | | | |
| --- | --- | --- | --- | --- | --- |
|  | 800 | 900 | 1000 | 1100 | 1200 |
| Volume of Micropores Smaller than 8 Å (×10$^{-4}$) (cc/g) | 2.0 | 3.2 | 4.3 | 5.2 | 6.6 |
| Volume of pores of 8–18 Å (×10$^{-4}$) (cc/g) | 4.8 | 6.0 | 7.2 | 8.4 | 9.6 |
| Capacity (mAh/g) | 460 | 390 | 335 | 300 | 270 |
| Efficiency (%) | 76 | 77 | 78 | 80 | 83 |

Comparative Example 1

Masses (30 to 150 mm in size) of the green coke used in Example 1 were put in a graphite-made tray and heated in a box type electric furnace up to 800–1200° C. at a rate of temperature rise of 10° C./min in a nitrogen stream as shown in table 2, at which the coke was maintained for 1 hour. The resulting coke was pulverized in a jet mill to obtain a carbonaceous negative electrode material having an average particle size of 11 to 12 $\mu$m and a maximum particle size of 45 $\mu$m.

The measurements of micropore volume and charge and discharge capacity and efficiency were made on the resulting carbonaceous negative electrode material, same as the example 1. The results obtained are shown in Table 2 below.

TABLE 2

|  | Heating Temp. (° C) | | |
| --- | --- | --- | --- |
|  | 800 | 1000 | 1200 |
| Volume of Micropores Smaller than 8 Å (×10$^{-4}$; cc/g) | 9.6 | 13.0 | 15.1 |
| Volume of Pores of 8–18 Å (×10$^{-4}$; cc/g) | 15.6 | 21.9 | 26.8 |
| Capacity (mAh/g) | 415 | 285 | 230 |
| Efficiency (%) | 58 | 71 | 76 |

EXAMPLE 2

Green coke having a volatile content of 18% which was obtained by coking coal tar was pulverized in a rotary impact pulverizer and passed through a sieve of 86 $\mu$m to obtain fine particles having an average particle size of 18 $\mu$m. The particles were put in a stainless steel-made tray in a 10-mm thick layer and heated in a box type electric furnace up to 150° C. at a rate of temperature rise of 10° C./min in an air stream and then up to a temperature of from 250 to 400° C. as shown in Table 3 below at a rate of 1° C./min, at which the particles were kept for 30 minutes to conduct a first stage heat treatment.

After once cooled, the tray was taken out from the oven and again placed in a box type electric furnace and heated in a nitrogen stream at a rate of 10° C./min up to 1000° C., at which the particles were maintained for 1 hour to conduct a second stage heat treatment.

The same measurements of micropore volume and charge and discharge capacity and efficiency were made on the resulting carbonaceous negative electrode material. The results obtained are shown in Table 3.

TABLE 3

|  | 1st stage Heating Temp. (° C.) | | | |
| --- | --- | --- | --- | --- |
|  | 250 | 300 | 350 | 400 |
| Volume of Micropores Smaller than 8 Å (×10$^{-4}$; cc/g) | 2.7 | 3.0 | 3.7 | 4.9 |
| Volume of Pores of 8–18 Å (×10$^{-4}$; cc/g) | 5.1 | 5.6 | 6.5 | 8.9 |
| Capacity (mAh/g) | 351 | 375 | 400 | 380 |
| Efficiency (%) | 74 | 78 | 80 | 78 |

Comparative Example 2

A carbonaceous negative electrode material was obtained in the same manner as in Example 2, except for changing the second stage heat treatment conditions to 450° C. and 30 minutes.

As a result of the same measurements as in Example 1, the resulting carbonaceous negative electrode material had a total volume of micropores smaller than 8 Å of $28.5 \times 10^{-4}$ cc/g, a total volume of pores of 8 to 18 Å of $46.6 \times 10^{-4}$ cc/g, a capacity of 355 mAh/g, and an efficiency of 70%.

EXAMPLE 3

The fine particles of green coke obtained in Example 2 were put in a stainless steel-made tray in a 10-mm thick layer and heated in a box type electric furnace up to 120° C. at a rate of temperature rise of 10° C./min in an atmosphere of air containing 10% by volume of nitrogen, at which temperature the particles were kept for 30 minutes to conduct a first stage heat treatment.

After once cooled, the tray was taken out from the oven and again placed in a box type electric furnace and heated in a nitrogen stream at a rate of 10° C./min up to 1000° C., at which the particles were maintained for 1 hour to conduct a second stage heat treatment.

As a result of the same measurements as in Example 1, the resulting carbonaceous negative electrode material had a total volume of micropores smaller than 8 Å of $3.1 \times 10^{-4}$ cc/g, a total volume of pores of 8 to 18 Å of $6.1 \times 10^{-4}$ cc/g, a capacity of 380 mAh/g, and an efficiency of 71%.

EXAMPLE 4

A carbonaceous negative electrode material was prepared in the same manner as in Example 3, except that the first stage heat treatment was followed by a second stage heat treatment at 450° C. for 1 hour in a nitrogen stream and further followed by a final heat treatment at 1000° C. for 1 hour in a nitrogen stream.

As a result of the same measurements as in Example 1, the resulting carbonaceous negative electrode material had a total volume of micropores smaller than 8 Å of $3.9 \times 10^{-4}$ cc/g, a total volume of pores of 8 to 18 Å of $6.7 \times 10^{-4}$ cc/g, a capacity of 405 mAh/g, and an efficiency of 79%.

EXAMPLE 5

Green coke having a volatile content of 5.6% which was obtained by coking coal tar was pulverized in a jet mill to obtain fine particles having an average particle size of 11 μm and a maximum particle size of 40 μm. The particles were put in a graphite-made tray in a layer 40 mm thick and heated in a box type electric furnace up to 450° C. at a rate of temperature rise of 10° C./min in a nitrogen stream, at which the particles were kept for 1.5 hours to conduct a first stage heat treatment.

After once cooled, the tray was taken out from the oven, and the yield of the first stage heat treatment was measured. The tray was again placed in the box type electric furnace and heated in a nitrogen stream at a rate of 10° C./min up to a temperature of from 800 to 1200° C. as shown in Table 4 below, at which the particles were maintained for 1 hour to conduct a second stage heat treatment. The yield of the second stage heat treatment was also measured.

A test battery was assembled by using the resulting carbonaceous negative electrode material in the same manner as in Example 1, and the battery performance (capacity and efficiency) was evaluated by using a cell as shown in FIG. 1 in the same manner as in Example 1. The results obtained are shown in Table 4.

TABLE 4

|  | 2nd stage Heating Temp. (° C.) | | | | |
| --- | --- | --- | --- | --- | --- |
|  | 800 | 900 | 1000 | 1100 | 1200 |
| Yield of 1st stage Heat Treatment (%) | 97.7 | 97.5 | 97.4 | 97.5 | 97.3 |
| Yield of 2nd stage Heat Treatment (%) | 94.4 | 95.1 | 94.9 | 94.7 | 94.7 |
| Overall Yield (%) | 92.6 | 92.7 | 92.4 | 92.3 | 92.1 |
| Capacity (mAh/g) | 450 | 385 | 330 | 300 | 270 |
| Efficiency (%) | 75 | 76 | 77 | 79 | 82 |

Comparative Example 3

A carbonaceous negative electrode material was prepared in the same manner as in Example 5, except that the first stage heat treatment was omitted. The results of the evaluation on battery performance are shown in Table 5 below.

TABLE 5

|  | Heating Temp. (° C.) | | | | |
| --- | --- | --- | --- | --- | --- |
|  | 800 | 900 | 1000 | 1100 | 1200 |
| Yield of Heat Treatment (%) | 94.0 | 93.7 | 93.2 | 92.6 | 92.0 |
| Capacity (mAh/g) | 430 | 360 | 310 | 280 | 260 |
| Efficiency (%) | 72 | 75 | 75 | 77 | 79 |

Comparative Example 4

Masses (30 to 150 mm in size) of the green coke used in Example 5 were subjected to the same heat treatment as in Comparative Example 3 and then pulverized in a jet mill to obtain a particulate carbonaceous negative electrode material having an average particle size of 13 μm and a maximum particle size of 45 μm.

The performance of a test battery using the resulting negative electrode material was evaluated in the same manner as in Example 5. The results obtained are shown in Table 6 below.

TABLE 6

| | Heating Temp. (° C.) | | | | |
|---|---|---|---|---|---|
| | 800 | 900 | 1000 | 1100 | 1200 |
| Yield of Heat Treatment (%) | 96.0 | 95.4 | 95.0 | 94.8 | 94.3 |
| Capacity (mAh/g) | 420 | 350 | 300 | 270 | 240 |
| Efficiency (%) | 56 | 66 | 71 | 74 | 75 |

EXAMPLE 6

A carbonaceous negative electrode material was prepared in the same manner as in Example 5, except for varying the first heating temperature from 300 to 600° C. as shown in Table 7 below (first stage heat treatment) and fixing the second heating temperature at 1000° C. (second stage heat treatment). The performance of a test battery using the resulting negative electrode material was evaluated in the same manner as in Example 6. The results obtained are shown in Table 7.

TABLE 7

| | 1st stage Heating Temp. (° C.) | | | |
|---|---|---|---|---|
| | 300 | 400 | 500 | 600 |
| Yield of 1st stage Heat Treatment (%) | 98.8 | 98.0 | 96.5 | 94.1 |
| Yield of 2nd stage Heat Treatment (%) | 93.5 | 94.3 | 95.6 | 98.1 |
| Overall Yield (%) | 92.4 | 92.4 | 92.3 | 92.3 |
| Capacity (mAh/g) | 325 | 330 | 335 | 315 |
| Efficiency (%) | 76 | 78 | 76 | 75 |

EXAMPLE 7

A carbonaceous negative electrode material was prepared in the same manner as in Example 5, except for varying the first heating time from 0.5 to 5 hours as shown in Table 8 below (first stage heat treatment) and fixing the second heating temperature at 1000° C. (second stage heat treatment). The performance of a test battery using the resulting negative electrode material was evaluated in the same manner as in Example 5. The results obtained are shown in Table 8.

TABLE 8

| | 1st stage Heating Time (hr) | | | | |
|---|---|---|---|---|---|
| | 0.5 | 1.0 | 1.5 | 3.0 | 5.0 |
| Yield of 1st stage Heat Treatment (%) | 98.8 | 98.1 | 97.4 | 96.9 | 96.5 |
| Yield of 2nd stage Heat Treatment (%) | 93.6 | 94.2 | 94.9 | 95.8 | 95.7 |
| Overall Yield (%) | 92.5 | 92.4 | 92.4 | 92.8 | 92.4 |
| Capacity (mAh/g) | 315 | 330 | 330 | 325 | 330 |
| Efficiency (%) | 75 | 77 | 77 | 77 | 76 |

EXAMPLE 8

The same green coke as used in Example 5 was pulverized in a jet mill or an impact pulverizer to fine particles having an average particle size of 11 to 135 μm as shown in Table 9 below. The particles were subjected to first and second stage heat treatments in the same manner as in Example 5 except for fixing the second heating temperature at 1000° C. The performance of a test battery using the resulting negative electrode material was evaluated in the same manner as in Example 5. The results obtained are shown in Table 9.

TABLE 9

| Average Particle size (μm) | 11 | 21 | 44 | 79 | 135 |
|---|---|---|---|---|---|
| Yield of 1st stage Heat Treatment (%) | 97.4 | 97.6 | 96.9 | 97.8 | 98.9 |
| Yield of 2nd stage Heat Treatment (%) | 94.9 | 94.8 | 95.9 | 95.6 | 95.6 |
| Overall Yield (%) | 92.4 | 92.5 | 92.9 | 93.5 | 94.5 |
| Capacity (mAh/g) | 330 | 330 | 315 | 310 | 300 |
| Efficiency (%) | 77 | 76 | 75 | 73 | 71 |

EXAMPLE 9

Green coke having a volatile content of 25.2% which was obtained by coking coal tar was put in a stainless steel-made dish and heated in a box type electric furnace at 425° C. or 450° C. for 5 hours in a nitrogen atmosphere to obtain green coke having a volatile content of 19.1% or 12.6%, respectively.

The above described green coke having a volatile content of 19.1% or 12.6%, respectively, the green coke having a volatile content of 5.6% used in example 5, and green coke having a volatile content of 25.2% without being heated, were pulverized in a jet mill to particles having the average particle size shown in Table 10 below. The particles were subjected to first and second stage heat treatments in the same manner as in Example 5 except for fixing the second heating temperature at 1000° C. The performance of a test battery using the resulting negative electrode material was evaluated in the same manner as in Example 5. The results obtained are shown in Table 10.

TABLE 10

| Volatile Matter of Green Coke (%) | 5.6 | 12.6 | 19.1 | 25.2 |
|---|---|---|---|---|
| Average particle size (μm) | 11 | 10 | 13 | 12 |
| Yield of 1st stage Heat Treatment (%) | 97.4 | 96.7 | 96.7 | 95.4 |
| Yield of 2nd stage Heat Treatment (%) | 94.9 | 93.3 | 92.7 | 91.5 |
| Overall Yield (%) | 92.4 | 90.2 | 89.6 | 87.3 |
| Capacity (mAh/g) | 330 | 315 | 30S | 290 |
| Efficiency (%) | 77 | 75 | 72 | 69 |

While the invention has been described in detail and with reference to specific examples thereof, it will be apparent to one skilled in the art that various changes and modifications can be made therein without departing from the spirit and scope thereof.

What is claimed is:

1. A negative electrode material mixture for nonaqueous secondary batteries comprising:
(A) a carbonaceous negative electrode material for nonaqueous secondary batteries including
   (i) not less than $2 \times 10^{-4}$ cc/g of pores having a diameter of smaller than 8 Å and
   (ii) not more than $15 \times 10^{-4}$ cc/g of pores having a diameter of 8 to 18 Å, and
(B) graphite,
   wherein the graphite is made of graphite, at least part of the surface of which is coated with an amorphous carbon.

2. A negative electrode material mixture for nonaqueous secondary batteries comprising:

(A) a carbonaceous negative electrode material for nonaqueous secondary batteries including (i) not less than $2\times10^{-4}$ cc/g of pores having a diameter of smaller than 8 Å and (ii) not more than $15\times10^{-4}$ cc/g of pores having a diameter of 8 to 18 Å, and (B) graphite, wherein the graphite is graphite at least part of the surface of which is coated with an amorphous carbon obtained by mixing the graphite and an organic material oil, and then firing them.

3. A negative electrode material mixture for nonaqueous secondary batteries including (i) not less than $2\times10^{-4}$ cc/g of pores having a diameter of smaller than 8 Å and (ii) not more than $15\times10^{-4}$ cc/g of pores having a diameter of 8 to 18 Å, and (B) graphite, wherein the graphite is graphite at least part of the surface of which is coated with an amorphous carbon, obtained by mixing the graphite and a heated pitch obtained by heating heavy coal oil, heavy petroleum oil, or dissolvable heavy oil, and then firing them.

4. A nonaqueous secondary battery containing, a negative electrode material which is a mixture of (A) a carbonaceous material comprising:

(i) not less than $2\times10^{-4}$ cc/g of pores having a diameter of smaller than 8 Å; and (ii) not more than $15\times10^{-4}$ cc/g of pores having a diameter of 8 to 18 Å and (B) graphite, wherein the graphite is made of graphite at least part of the surface of which is coated with an amorphous carbon.

5. The nonaqueous secondary battery according to claim 4, wherein said battery is a lithium ion secondary battery.

6. A nonaqueous secondary battery containing, a negative electrode material which is a mixture of (A) a carbonaceous material comprising:

(i) not less than $2\times10^{-4}$ cc/g of pores having a diameter of smaller than 8 Å; and (ii) not more than $15\times10^{-4}$ cc/g of pores having a diameter of 8 to 18 Å and (B) graphite, wherein the graphite is graphite at least part of the surface of which is coated with an amorphous carbon obtained by mixing the graphite and an organic material oil, and then firing them.

7. A nonaqueous secondary battery containing, a negative electrode material which is a mixture of (A) a carbonaceous material comprising:

(i) not less than $2\times10^{-4}$ cc/g of pores having a diameter of smaller than 8 Å; and (ii) not more than $15\times10^{-4}$ cc/g of pores having a diameter of 8 to 18 Å and (B) graphite, wherein the graphite is graphite at least part the surface of which is coated with an amorphous carbon, obtained by mixing the graphite and a heated pitch obtained by heating heavy coal oil, heavy petroleum oil, or dissolvable heavy oil, and then firing them.

* * * * *